United States Patent [19]
Higgins et al.

[11] Patent Number: 5,879,715
[45] Date of Patent: Mar. 9, 1999

[54] PROCESS AND SYSTEM FOR PRODUCTION OF INORGANIC NANOPARTICLES

[75] Inventors: Richard J. Higgins, Reading; Robert L. Goldsmith, Wayland, both of Mass.

[73] Assignee: CeraMem Corporation, Waltham, Mass.

[21] Appl. No.: 921,670

[22] Filed: Sep. 2, 1997

[51] Int. Cl.$^6$ ............................... A61K 9/14; B01J 13/00
[52] U.S. Cl. .................... 424/489; 428/402; 502/439; 502/523; 423/659; 252/309; 252/313.1
[58] Field of Search ........................ 424/489; 428/402; 502/439, 523; 423/659; 252/309, 313.1

[56] References Cited

U.S. PATENT DOCUMENTS

| | | |
|---|---|---|
| 5,256,297 | 10/1993 | Feimer et al. . |
| 5,314,679 | 5/1994 | Lewis et al. . |
| 5,549,973 | 8/1996 | Majetich et al. . |
| 5,580,655 | 12/1996 | El-Shall et al. . |
| 5,628,981 | 5/1997 | Liversidge et al. . |
| 5,695,901 | 12/1997 | Selim . |

*Primary Examiner*—Edward J. Webman
*Attorney, Agent, or Firm*—Richard P. Crowley

[57] ABSTRACT

A process and system for the production of inorganic nanoparticles by precipitating the inorganic nanoparticles by a precipitating agent from a microemulsion with a continuous and a non-continuous phase; and concentrating the precipitated nanoparticles employing an ultrafiltration membrane.

24 Claims, 3 Drawing Sheets

PROCESS AND SYSTEM FOR PRODUCTION OF INORGANIC NANOPARTICLES

FIELD OF INVENTION

This invention is related to a production process for inorganic nanoparticles, that is unagglomerated inorganic particles of ca. 100 nm or less in diameter. More particularly, the invention relates to a more economic production method for inorganic nanoparticles synthesized via precipitation within micellar phases in microemulsions.

BACKGROUND OF INVENTION

"Nanoparticles," which are defined as particles with diameters of about 100 nm or less, are technologically significant, since they are utilized to fabricate structures, coatings, and devices that have novel and useful properties due to the very small dimensions of their particulate constituents. One method for synthesis of nanoparticles of a wide variety of inorganic compositions is so-called "microemulsion-mediated" synthesis.

A microemulsion is defined as a thermodynamically stable, optically isotropic dispersion of two immiscible liquids consisting of nano-size domains of one or both liquids in the other, stabilized by an interfacial film of surface-active molecules. Microemulsions usually are classified as either water-in-oil (w/o) or oil-in-water (o/w) depending on which is the dispersed phase. More generally, microemulsions of two non-aqueous liquids of differing polarity with negligible mutual solubility can also be prepared. In addition, certain systems that contain comparable amounts of two immiscible fluids will have a bi-continuous structure. When a dispersed phase is present, it will consist of monodispersed droplets, usually in the size range of 2 to 50 nm. These droplets are also known as micelles; in water-in-oil microemulsions, the aqueous droplets are also known as reverse micelles.

The nature of the surface-active film is key to microemulsion formation. By selection of appropriate surfactant chemistry and use of relatively large amounts of surfactant, microemulsions are produced spontaneously (i.e., without need for significant mechanical agitation). The very fine dispersed spherical micelles in microemulsions are thermodynamically stable due to a combination of very low interfacial tension ($10^{-2}$ to $10^{-3}$ mN/m) and a significant entropy of mixing from the very large numbers of particles produced. Two general types of surfactant systems are used to produce microemulsions. Most microemulsions utilize a two-surfactant system. For example, an oil can be emulsified first in water using an aqueous surfactant (or soap) such as potassium oleate. Addition of a co-surfactant, generally an alcohol of intermediate chain length, causes the milky emulsion to clear spontaneously due to formation of very small spheres of dispersed oil. Physically, this occurs by the alcohol molecules diffusing to the oil/water interfaces, where they orient in ordered fashion between the ionized soap molecules. This reduces the interfacial tension between the phases to near zero and allows appreciable bending of the surface film, thereby producing very small particles of dispersed phase. Use of relatively large amounts of surfactant and co-surfactant in these systems is necessary, since the relative amount of interfacial area in microemulsion systems per unit volume is intrinsically very high.

Certain non-ionic surfactants also can form microemulsions, often without need for co-surfactants, usually simplifying the phase chemistry of such systems. Example surfactants in this case include polyoxyethylene-nonylphenol ethers. The amphipathic structure of such surfactants allows them to form films with very low interfacial tension between oily and aqueous phases. The phase chemistry of these systems may exhibit quite strong temperature-dependent behavior in comparison to two-surfactant systems.

In general, an appropriate surfactant system will produce both oil-in-water microemulsions and water-in-oil microemulsions; only the exact composition of the system determines which type forms. Bi-continuous phase structures are usually formed when the oil and water contents of the system are closely matched. Furthermore, a number of ordered liquid crystalline phase structures and mixtures of different phases occur in most microemulsion systems.

The properties of water-in-oil microemulsions have been exploited for highly controlled formation of nanoparticles having a very homogeneous size distribution. In w/o microemulsions, the reverse micelles continuously collide, coalesce, and break apart due to Brownian motion, resulting in a continuous exchange of their contents. Solute initially present in a limited number of droplets will eventually be present in all droplets at an equilibrated average concentration. The kinetics of the collision process depend upon the diffusion of the aqueous droplets in the continuous oily phase, while those of the exchange process depend on parameters such as the attractive interactions between surfactant "tails" exposed to the oil phase and the rigidity of the interface as aqueous droplets approach close to each other. Use of microemulsions as "nano-reactors" for ultra-fine particle formation begins by dissolving a water-soluble reactant in a w/o microemulsion and allowing it to reach equilibrium distribution in each micelle. From this point, there are three general methods used to form nanoparticles within the aqueous micelles. These are illustrated in attached FIG. 1 as(a), (b) and (c).[1]

[1] V. Pillai et al., Adv. In Coll. And Interface Sci., 55, 241 (1995).

In the first technique, two identical water-in-oil microemulsions are first formed. Subsequently, reactant species A is added to one microemulsion while reactant species B is added to the other. A and B are soluble in the aqueous micelles and may be solid, liquid, or vapor species. A and B are chosen such that the soluble cationic portion of one reactant and the soluble anionic portion of the other reactant in the aqueous phase react to form a product of extremely low solubility, thereby resulting in product precipitation.

After allowing for the distribution of the dissolved species to equilibrate in the individual microemulsions (generally this occurs very quickly, e.g., within a few seconds to no more than several minutes), the two microemulsions are mixed. Due to collision and coalescence of the droplets, the reactants A and B come in contact with each other and react to form nano-sized precipitates. This precipitate is confined to the interior of the microemulsion droplets and the shape of the particle formed reflects the interior of the droplet. In this process, the overall reaction rate is controlled by the rate of coalescence of droplets if the intrinsic chemical reaction rate is fast. Because of this, properties of the microemulsion interface such as interfacial rigidity, as determined by specific surfactant chemistry, can strongly influence the measured reaction rates. Relatively rigid interfaces decrease the rates of droplet coalescence and overall reaction, while substantially fluid interfaces enhance these rates. The properties of the continuous oil phase and ionic strength and pH of the aqueous phase also can be manipulated to control reaction kinetics. Therefore, this reaction method provides a great degree of control over the nanoparticle formation process.

The other methods for nanoparticle synthesis via microemulsions are modifications to the first method and utilize only a single microemulsion containing a dissolved reactant. One of these involves subsequent addition of a reducing agent in the form of a liquid or gas (e.g., hydrogen or hydrazine) to the microemulsion, while the other involves addition of a precipitating agent, also as a liquid or gas (e.g., $O_2$, $CO_2$, $NH_3$). The former method has been used for production of metallic particles, while the latter has been employed for formation of nanoparticulate oxides, oxide precursors and carbonates.

Of importance is the fact that, for all of these methods, although the size of the nanoparticles produced is highly controllable, it is generally not directly related to the size of the aqueous micelles and usually is not easily correlated with the amount of reactant originally present in each droplet. Even small nanoparticles (e.g., having diameters of 2 nm to 5 nm) contain from about 300 to 1000 atoms, which is in most cases appreciably larger than the number of reactant molecules present in each micelle prior to reaction. This indicates that nanoparticle nuclei first form in a small fraction of micelles; these then consume the reactant in other micelles through collision-coalescence processes. Through empirical adjustment of initial reactant concentrations and microemulsion compositional parameters, nanoparticles with homogeneous size distribution and average particle diameters ranging from about 2 nm to about 100 nm can be produced via microemulsion synthesis. In certain cases, the nucleation rate of particles can be appreciably greater than the growth rate of the particles, resulting in precipitation of very small nanoparticles (e.g. 2 nm or less in diameter) in each micelle.

Since the first use of microemulsion synthesis techniques for ultra-fine catalyst production in 1982,[2] an appreciable amount of research has been performed on specific microemulsion synthesis techniques to obtain a large number of chemical compounds in nanoparticulate form. Much of this work has been performed by Shah and co-workers, who have very recently reviewed the current state of the art in this area.[1] Compounds that have been produced successfully with these techniques include rare metal catalysts (Pt, Pd, Rh, and Ir), nickel and iron catalysts, semiconductors (CdS, CdSe), carbonates (including calcium carbonate, an important motor oil additive), silver halides, magnetic oxides ($Fe_2O_3$, barium ferrite), zinc oxide, and multi-cation high-temperature superconductors (Y—Ba—Cu—O and Bi—Pb—Sr—Ca—Cu—O systems). Furthermore, the product particles of these syntheses have been incorporated in devices having improved or novel properties as a result of the nanostructure of their components.

[2] M. Boutonnet et al., Colloids Surfaces, 5, 209 (1982).
[1] V. Pillai et al., Adv. In Coll. And Interface Sci., 55, 241 (1995).

The microemulsion synthesis technique has a number of advantages in comparison to alternative methods for formation of nanoparticles, viz:

It utilizes inexpensive and common reactant compounds (e.g., water-soluble salts).

For production of liquid-dispersed nanoparticulate products, only simple and inexpensive hardware is required.

It is a generic method for preparation of nanoparticles of any type of composition, including metals, oxides, borides, and semiconductors. It is also readily amenable to production of coated nanoparticles, i.e., nanocomposites.

It allows for a very high degree of control over the chemical and physical characteristics and homogeneity of the particles. Very narrow-size-distribution powders are prepared and their average size can be readily tailored. For multi-cationic compositions in particular, the microemulsion process allows a degree of control of chemical homogeneity that is not attainable with nearly all other nanoparticle synthesis methods.

Bench-scale methods developed to date for synthesis of nanoparticles via microemulsions are directly applicable to scale-up to high volume production. However, in order to be practical (cost-effective and environmentally acceptable) on a large scale, an effective processing scheme is necessary that allows both: (i) recovery of non-aggregated nanoparticles, either in a concentrated stable liquid dispersion suitable for coating applications, or as solid powder; and (ii) recycle and reuse of the oils and surfactants used in the microemulsion synthesis in order to limit costs for both process inputs and organic waste disposal. The bench-scale research on microemulsions performed to date has typically utilized centrifugation of the entire microemulsion combined with co-solvent extraction/rinsing methods for nanoparticle recovery. These techniques are not attractive for application to industrial-scale production of nanoparticles via microemulsion synthesis since they are not readily scaled up and would produce large quantities of organic waste.

Thus, successful development of an economical large-scale manufacturing process for nanoparticles based on microemulsion synthesis requires identification and development of a practical processing scheme for nanoparticle recovery and oil/surfactant recycle. Such an enabling process is the subject of this invention.

SUMMARY OF INVENTION

It is therefore an object of this invention to provide a process for production of inorganic nanoparticles.

It is a further object of this invention to provide a process for production of inorganic nanoparticles by synthesis methods that are applicable to a wide range of inorganic compositions, i.e., via precipitation of such nanoparticles within a non-continuous micellar phase in a microemulsion.

It is a further object of this invention to provide a process for production of inorganic nanoparticles that has inherently low related production costs.

This invention relates to a process for production of inorganic nanoparticles, comprising the steps of:

precipitating the inorganic nanoparticles within a non-continuous micellar phase in a microemulsion containing a non-continuous micellar phase and a continuous phase concentrating the nanoparticles for recovery by ultrafiltration employing a semipermeable membrane with a pore size selected to retain substantially all the nanoparticles precipitated in the micellar phase, while permeating the microemulsion continuous phase and the micellar phase not containing precipitated nanoparticles.

The precipitated nanoparticles produced by this process may have diameters in the range of 2 nm to 100 nm, with extremely monodisperse particle size distribution.

In one embodiment, the precipitated nanoparticles are further processed (e.g., by rinsing, drying, and/or annealing) to yield a final dry product with desired chemical composition. Such compositions would include crystalline, thermally stable phases suitable for a wide range of technological uses.

In another embodiment, the permeate stream from ultrafiltration is recycled for reuse as a medium for precipitation of additional nanoparticles after replenishment with reagents used for the precipitation reaction and components required to form the micellar phase or the continuous phase of the microemulsion. The permeate stream may be purified prior to recycle for reuse to remove byproducts produced in the nanoparticle precipitation reaction. Such byproducts may include ionic reaction byproducts that remain soluble in the non-continuous micellar phase of the microemulsion. The purification process may employ one or more of the following methods: adsorption, thermal phase separation, ion exchange, or electrodialysis.

In still another embodiment, the semipermeable membrane employed for ultrafiltration to concentrate the nanoparticles for recovery is a ceramic membrane. The ceramic membrane may be composed of materials selected from the group containing alumina, zirconia, titania, silica, or other ceramic oxides, singly or in combination.

In still another embodiment, the nanoparticles are formed by chemical precipitation arising from admixing a first microemulsion having a non-continuous micellar phase containing a dissolved metallic salt and a second microemulsion having a non-continuous micellar phase containing a dissolved precipitating agent or reactant. The dissolved metallic salt may be selected from the group containing metallic salts of zinc, titanium, aluminum, iron, chromium, yttrium, copper, tin, calcium, silicon, cerium, magnesium, vanadium, cobalt, nickel, strontium, zirconium, cadmium, barium, lithium, lead, bismuth, silver, manganese, antimony and lanthanum, and mixtures thereof. The dissolved precipitating agent or reactant may be selected from the group containing soluble hydroxides, carbonates, mineral acids, organic acids, sulfides, halides, borohydrides and chalcogenides, and combinations thereof.

In yet another embodiment, the nanoparticles are formed by chemical reduction in a microemulsion with a non-continuous phase containing a reducible salt of a metal. The metal salt may be selected from the group containing platinum, iridium, gold, silver, palladium, rhodium, ruthenium, osmium, rhenium, copper, nickel, cobalt, iron, neodymium and boron, and combinations thereof. The reductant may be selected from the group containing hydrogen gas and hydrazine.

In one embodiment, the non-continuous micellar phase of the microemulsion is aqueous in nature. The micelles may consist of spheroidal cores in a range of 2 to 25 nm in diameter. The continuous phase of the microemulsion may be a hydrocarbon liquid and may be selected from the group of hydrocarbons containing linear and cyclic paraffins having five to ten carbon atoms.

Other objects, features, and advantages will occur from the following descriptions of preferred embodiments and accompanying drawings.

DESCRIPTION OF THE EMBODIMENTS

Figure 1:
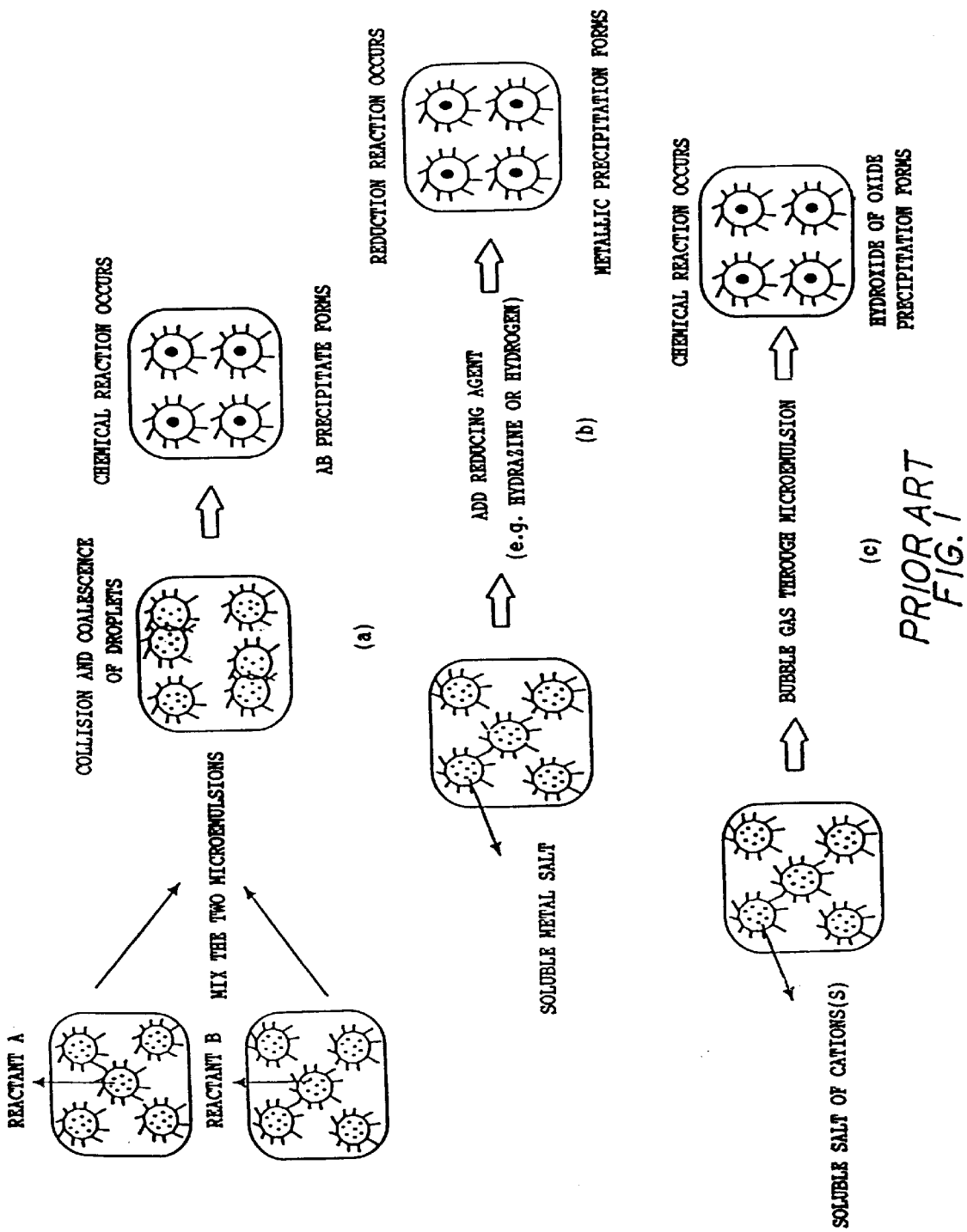
FIG. 1 is a schematic diagram that depicts methods (a), (b) and (c) for synthesis of inorganic nanoparticles by precipitation within non-continuous micellar phases of microemulsions.
Figure 2:
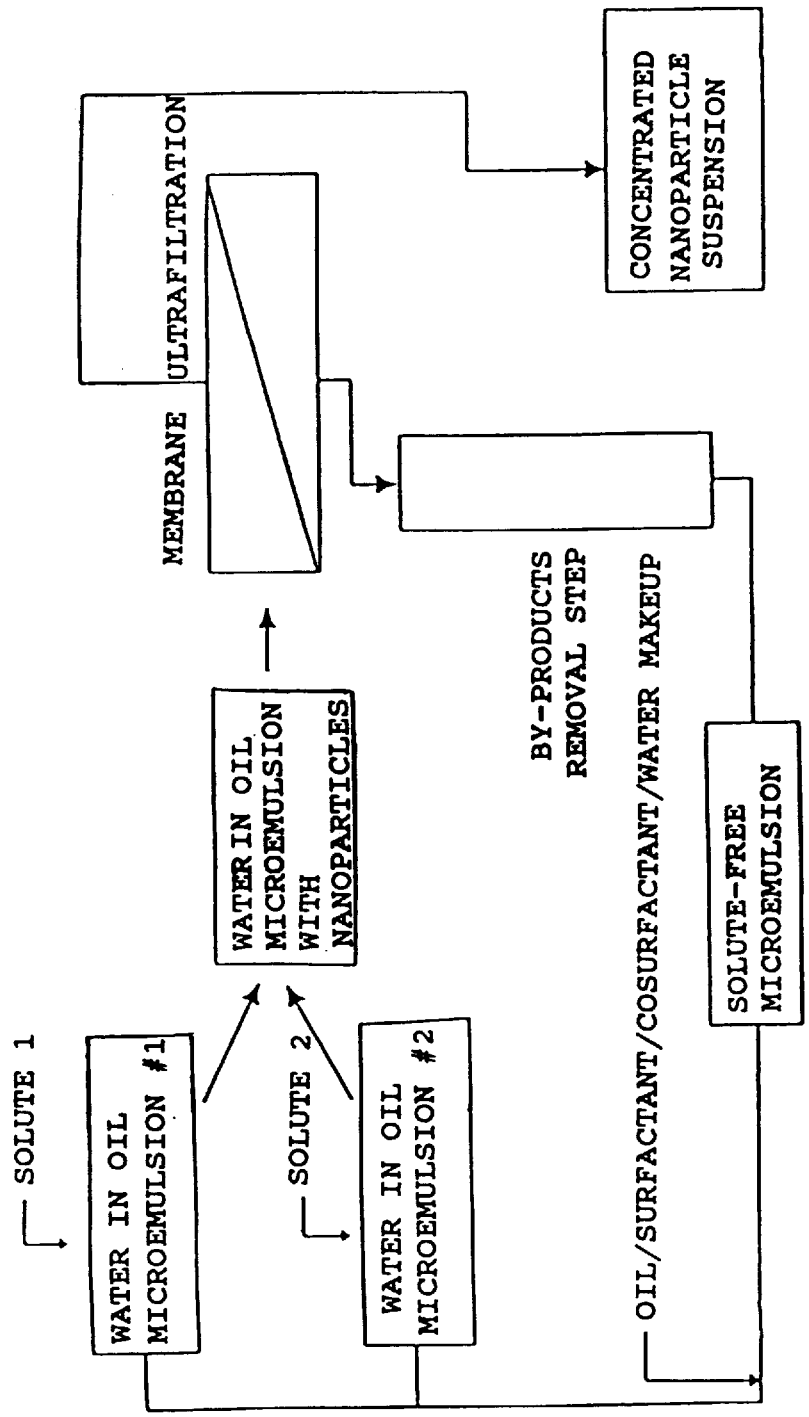
FIG. 2 is a flow schematic diagram for a nanoparticle production and recovery process according to this invention.

The invention may be accomplished by first precipitating nanoparticles by the method depicted schematically in FIG. 1. Two microemulsions with identical relative amounts of low polarity ("oil") continuous phase, higher polarity ("water") micellar phase, surfactant, and co-surfactant (if present) are initially prepared. One ("Microemulsion #1" in FIG. 2) contains dissolved metal salts in its micelles while the other ("Microemulsion #2 " in FIG. 2) contains a second reactant or precipitating agent. These microemulsions subsequently are mixed in equal proportion, either continuously or in batches, to form a new microemulsion in which equilibration of the solutes within the micelles causes precipitation reactions to form product nanoparticles. The residence time of reaction prior to separation is sufficient to allow substantially complete reactant consumption and equilibration of solutes to occur.

In the nanoparticle recovery step of this process, the microemulsion is subjected to crossflow ultrafiltration employing a semi-permeable membrane with a pore size selected to retain substantially all the nanoparticles precipitated in the micellar phase of the microemulsion, while permeating the microemulsion continuous phase not containing precipitated nanoparticles. For the relatively rare case of a microemulsion in which substantially all micelles contain precipitated nanoparticles, the pore size of the semi-permeable membrane is selected to retain substantially all the nanoparticles while permeating only the microemulsion continuous phase. A key discovery underlying this process step, which has not been previously disclosed and is not obvious to those familiar with ultrafiltration of micellar-based solutions, is the ability to readily permeate micelles of a particular diameter that do not contain solid nanoprecipitates through a semi-permeable membrane with a characteristic pore size that is smaller than the diameter of the micelles.

Prior art (U.S. Pat. No. 5,205,937, Bhave, et al.) discloses use of ceramic crossflow filtration for separating contaminants from water-based cleaners that are microemulsions containing low molecular weight hydrocarbon contaminants within micelles, but does not disclose such treatment of oil-based (continuous oil phase) microemulsions nor presence of precipitates or solids trapped within micelles.

The concentrated precipitated nanoparticles can subsequently be conveniently post-processed using a variety of methods, including washing with small amounts of co-solvents to separate them from residual surfactants, and/or drying and calcination to yield a final dry product with a desired chemical composition, typically a crystalline, thermally stable phase. The permeated microemulsion containing no precipitated solids in its micelles can subsequently be recycled for reuse for further preparation of precipitated nanoparticles after replenishment with soluble reagents used for the precipitation reaction (and, if necessary, after purification to remove soluble byproducts produced in the nanoparticle precipitation reaction and/or replenishment with amounts of microemulsion phase components to readjust the composition of the microemulsion).

The following actual examples illustrate the described invention.

EXAMPLE 1

Two microemulsions of equal volume of the following overall composition were prepared by mixing together of the components:

n-Octane 63.6 wt %
Cetyl Trimethylammonium Bromide 16.6 wt %
n-Butanol 12.1 wt %
Aqueous 7.7 wt %

The two microemulsions contained 0.1M dissolved reactants in the aqueous phase: microemulsion 1 contained zinc nitrate hexahydrate, while microemulsion 2 contained ammonium carbonate. After equilibrating, the microemulsions contained the aqueous phase as discrete monodisperse spherical micelles of about 8 nm diameter (e.g., based on dynamic light scattering measurements).[3]

[3] P. Ayyub et al., *J. Chem. Soc. Faraday Trans.*, 89, 3585 (1993).

The two microemulsions were mixed, leading to exchange of the solutes within the aqueous micelles. Within minutes after mixing, equilibration of solute in micelles caused the following precipitation reaction to take place:

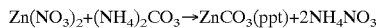

$$Zn(NO_3)_2 + (NH_4)_2CO_3 \rightarrow ZnCO_3(ppt) + 2NH_4NO_3$$

Due primarily to the specific microemulsion chemistry employed, nucleation of nanoparticles was slow compared to inter-molecular exchange processes, thereby causing nanoparticles to nucleate and grow in a very small fraction of the aqueous micelles of the new microemulsion. After reaction had ceased, monodisperse zinc carbonate nanoparticles with diameter of about 40 nm (e.g., by dynamic light scattering experiments or by electron microscopy of recovered non-aggregated particles) were present in a small fraction of aqueous micelles, stabilized by surfactant adsorption from aggregation with other nanoparticles. The majority of micelles, i.e., those not containing nanoparticle precipitates, did not change significantly in size. Based on the relative sizes of micelles containing nanoparticles and initial micelles containing dissolved reactant salts, calculations show that the fraction of micelles containing nanoparticles was only $6 \times 10^{-6}$.

Figure 3:
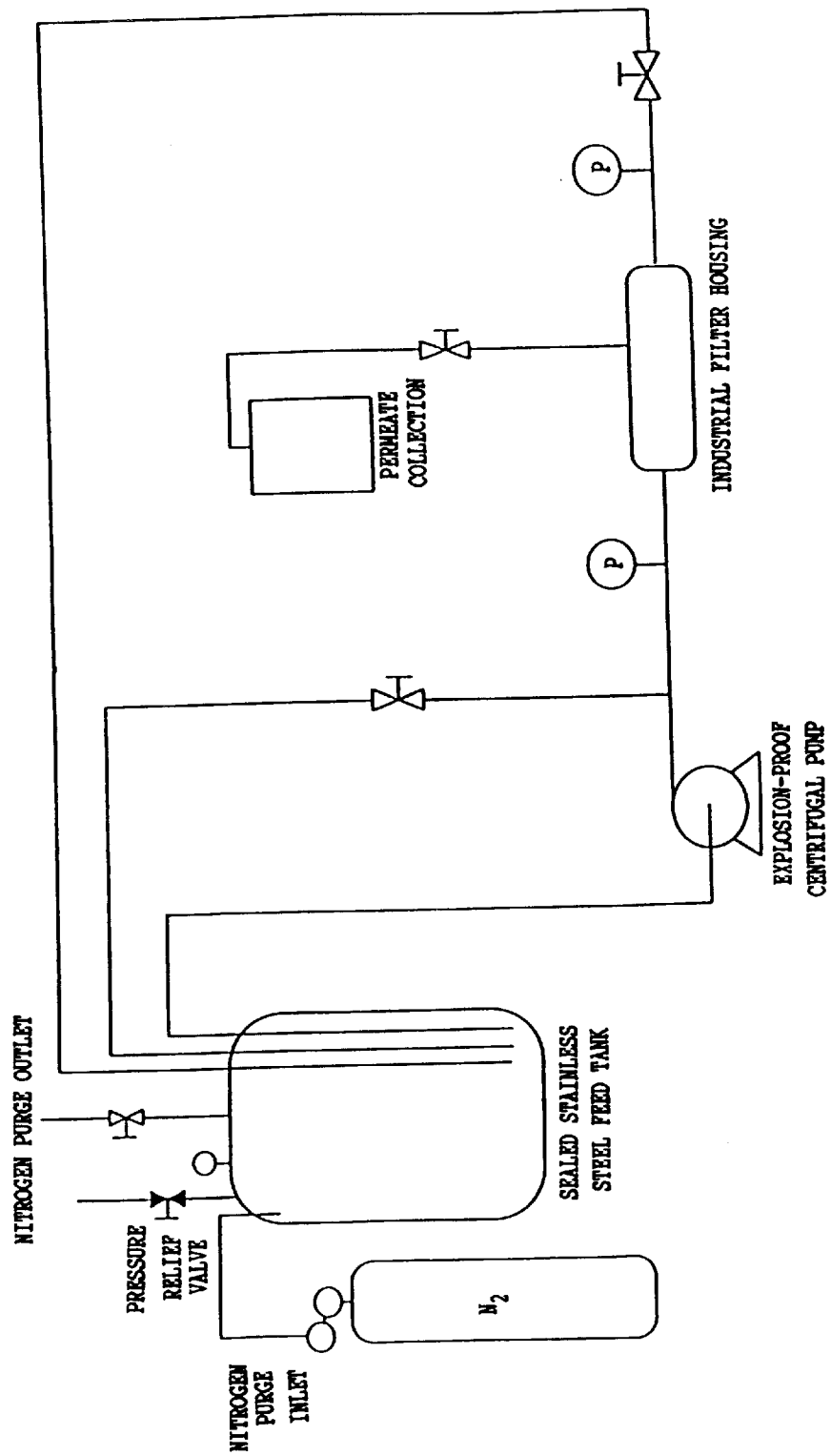
FIG. 3 is a flow schematic diagram of a crossflow ultrafiltration system suitable for concentration of nanoparticles precipitated within the non-continuous phase of a microemulsion.

The microemulsion containing precipitated nanoparticles was then passed through a ceramic crossflow membrane filtration module (CeraMem Separations Incorporated LMA laboratory-scale module) with a separation layer composed of titanium dioxide and a pore size of 10 nm. A bench-scale process system depicted in FIG. 3 was employed for this purpose. The microemulsion was fed into the membrane module at a crossflow velocity rate of about 3 m/s and transmembrane pressure was held constant at about 18 psig. Permeate from the membrane module was collected in a separate collection vessel. The microemulsion was concentrated from an initial volume of 20 liters to a final volume of 0.4 liters (the limit of concentration for the available filtration units). The collected permeate (16.6 liters) was analyzed for zinc content via atomic adsorption spectroscopy and water content via Karl Fischer titration. The zinc content of the permeate was determined to be less than 5 ppm (corresponding to soluble zinc), as compared to 250 ppm in the initially filtered feed microemulsion, while the water content of the permeate was 7.7 wt %, identical to that of the initially filtered feed microemulsion within the limits of precision of the analysis. These measurements proved that the ultrafiltration process retained essentially all the zinc carbonate nanoparticles while permeating the microemulsion continuous phase and micelles not containing nanoparticles. The concentrate (not analyzed by chemical means) contained a turbid liquid mixture containing zinc carbonate nanoparticles stabilized by adsorbed surfactant.

EXAMPLE 2

A procedure identical to that of Example 1 was followed, with the exception that a ceramic crossflow membrane filtration module (CeraMem Separations Incorporated LMA laboratory-scale module) with a separation layer composed of γ-aluminum oxide and a pore size of 5 nm was employed to conduct the ultrafiltration step. Quantitative analysis of the permeate after concentration of the microemulsion containing zinc carbonate nanoparticles showed that less than 5 ppm zinc were present along with 5.0 wt % water. Therefore, all nanoparticles were retained by the membrane while about 65% of the aqueous micelles not containing nanoparticles were permeated by the membrane, despite the fact that these micelles were about 60% larger in diameter than the pore size of the membrane. It is speculated that this result was obtained due to a combination of causes. First, the membrane pores have a minor degree of polydispersity, i.e., a fraction of pores larger than the diameter of the aqueous micelles were present. Second, the aqueous micelles are highly deformable due to their extremely low interfacial energy and likely deform under shear to pass through the membrane pores.

EXAMPLE 3

Two microemulsions of equal volume of the following overall composition were prepared by mixing together of the components:

Cyclohexane 60.00 wt %
Triton® X-100 16.75 wt %
n-Hexanol 13.25 wt %
Aqueous 10.00 wt %

The two microemulsions contained 0.1M dissolved reactants in the aqueous phase: microemulsion 1 contained zinc nitrate hexahydrate, while microemulsion 2 contained ammonium carbonate. After equilibrating, the microemulsions contained the aqueous phase as discrete monodisperse spherical micelles of about 20 nm diameter (e.g., based on dynamic light scattering measurements).[4]

[4] V. Chhabra et al., *Matls. Lett.*, 26, 21 (1996).

The two microemulsions were mixed, leading to exchange of the solutes within the aqueous micelles. The precipitation reaction described in Example 1 occurred and was complete within several minutes, leading to production of spherical zinc carbonate nano-precipitates with diameter of 18 nm present in a small fraction of aqueous micelles. Assuming that the volume of water within micelles containing the nanoparticles was equal to that of micelles not containing nanoparticles, the diameter of the micelles containing the nanoparticles grew to about 24 nm. Based on the relative sizes of micelles containing nanoparticles and initial micelles containing dissolved reactant salts, calculations show that the fraction of micelles containing nanoparticles was about $1.1 \times 10^{-3}$.

The microemulsion containing precipitated nanoparticles was then passed through a ceramic crossflow membrane filtration module (CeraMem Separations Incorporated LMA laboratory-scale module) with a separation layer composed of titanium dioxide and a pore size of 10 nm in the manner described in Example 1. The zinc content of the permeate was determined to be less than 5 ppm (corresponding to soluble zinc), as compared to 250 ppm in the initially filtered feed microemulsion, while the water content of the permeate was 9.0 wt %, only slightly lower than that of the initially filtered feed microemulsion. These measurements proved that the ultrafiltration process retained essentially all the zinc carbonate nanoparticles while permeating the microemulsion continuous phase and nearly all of the micelles not containing nanoparticles. The membrane with pore size only one-half that of the diameter of the aqueous micelles was able to permeate the majority of the micelles not containing precipitated solids, probably due to deformation of these micelles under shear. The concentrate (not analyzed by chemical means) contained a turbid liquid mixture containing zinc carbonate nanoparticles stabilized by adsorbed surfactant.

EXAMPLE 4

The permeate from the crossflow membrane separation described in Example 3 was passed through a bed of mixed bed ion exchange resin (DOWEX® MR-3) to remove soluble ammonium and nitrate ions (byproducts of the zinc carbonate nanoparticles reaction) from the micelles present in the permeate microemulsion. The progress of ion exchange reactions was followed by continuously monitoring the conductivity of the microemulsion with a conductivity meter. After the microemulsion had achieved a conductivity level equivalent to that for a microemulsion of equivalent composition containing no dissolved solutes in its aqueous micelles, it was used to prepare nanoparticles exactly as described in Example 3. After recovery of nanoparticles, also in a manner identical to that described in Example 3, the resulting nanoparticle-free microemulsion permeate was again treated by passing through the mixed bed ion exchange resin. Subsequently, it was used again to prepare and recover nanoparticles as described in Example 3.

The three lots of zinc carbonate nanoparticles prepared from the same batch of microemulsion that was repeatedly treated and recycled were washed with small volumes of organic solvents to remove adsorbed surfactant, then were dried and calcined to 300° C., causing the zinc carbonate to decompose to zinc oxide. The zinc oxide nanoparticles batches were examined via transmission electron microscopy (TEM) and analyzed by nitrogen adsorption. TEM observations at up to 200,000× indicated that the particle lots were indistinguishable in terms of particle size, particle size distribution, and particle shape. Nitrogen adsorption tests yielded BET surface areas of the three powder batches to be 78.3±0.8 $m^2/g$, 75.3±1.3 $m^2/g$, and 69.4±0.8 $m^2/g$. The equivalent spherical diameters of these nanoparticles was therefore 14.3±0.7 nm.

Other embodiments will occur to those skilled in the art and are within the following claims:

What is claimed is:

1. A process for production of inorganic nanoparticles, comprising the steps of:
    a) precipitating the inorganic nanoparticles within a non-continuous micellar phase in a microemulsion containing a non-continuous micellar phase and a continuous phase; and
    b) concentrating the nanoparticles for recovery by ultrafiltration employing a semipermeable membrane with a pore size selected to retain substantially all the nanoparticles precipitated in the micellar phase, while permeating a permeate stream of the microemulsion continuous phase and the micellar phase not containing precipitated nanoparticles.

2. The process of claim 1 in which the precipitated nanoparticles have diameters in the range of about 2 nm to 100 nm.

3. The process of claim 1 in which the precipitated nanoparticles are further processed to yield a final dry product with desired chemical composition.

4. The process of claim 1 in which the permeate stream is recycled for reuse as a medium for precipitation of additional nanoparticles after replenishment with reagents used for the precipitation reaction and components required to form the micellar phase or the continuous phase of the microemulsion.

5. The process of claim 4 in which the permeate stream is purified prior to recycle for reuse to remove byproducts produced in the nanoparticle precipitation reaction.

6. The process of claim 5 in which the permeate stream is purified to remove ionic reaction byproducts.

7. The process of claim 6 in which the purification process uses adsorption, thermal phase separation, ion exchange, or electrodialysis.

8. The process of claim 1 in which the ultrafiltration membrane is a ceramic membrane.

9. The process of claim 8 in which the ceramic membrane is selected from the group consisting of alumina, zirconia, titania, silica, or other ceramic oxides, and combinations thereof.

10. The process of claim 8 in which the nominal pore size of the membrane is in the range between about 2 nm and 200 nm.

11. The process of claim 1 in which the nanoparticles are formed by chemical precipitation arising from admixing a first microemulsion having a non-continuous micellar phase containing a dissolved metallic salt and a second microemulsion having a non-continuous phase containing a dissolved precipitating agent or reactant.

12. The process of claim 11 in which the dissolved metallic salt is selected from the group consisting of metallic salts of zinc, titanium, aluminum, iron, chromium, yttrium, copper, tin, calcium, silicon, cerium, magnesium, vanadium, cobalt, nickel, strontium, zirconium, cadmium, barium, lithium, lead, bismuth, silver, manganese, antimony and lanthanum, and combinations thereof.

13. The process of claim 11 in which the precipitating agent or reactant is selected from the group consisting of soluble hydroxides, carbonates, mineral acids, organic acids, sulfides, halides, borohydrides and chalcogenides, and combinations thereof.

14. The process of claim 1 in which the nanoparticles are formed by chemical reduction in a microemulsion with a non-continuous phase containing a reducible salt of a metal.

15. The process of claim 14 in which the reducible metal salt is a metal selected from the group consisting of platinum, iridium, gold, silver, palladium, rhodium, ruthenium, osmium, rhenium, copper, nickel, cobalt, iron, neodymium and boron, and combinations thereof.

16. The process of claim 15 in which the reductant is selected from the group containing hydrogen gas and hydrazine.

17. The process of claim 1 in which the non-continuous micellar phase is aqueous.

18. The process of claim 17 in which the non-continuous micellar aqueous phase comprises spheroidal cores in a range of 2 to 25 nm in diameter.

19. The process of claim 17 in which the continuous phase is a hydrocarbon.

20. The process of claim 17 in which the hydrocarbon is selected from the group containing linear and cyclic paraffins having five to ten carbon atoms.

21. A system for the production of inorganic nanoparticles which system comprises:
    a) a source of inorganic nanoparticles within a non-continuous micellar phase in a microemulsion containing a non-continuous micellar phase and a continuous phase;
    b) precipitating means to add a precipitating agent to the said source to precipitate the nanoparticles from the microemulsion;
    c) ultrafiltration semipermeable membrane means to concentrate the precipitated nanoparticles by retention and to permeate the microemulsion continuous phase and the micellar phase not containing the precipitated nanoparticles as a permeate stream; and d) means to recover the precipitated nanoparticles.

22. The system of claim 21 which includes means to recycle the permeate stream to the precipitating means.

23. The system of claim 22 which includes a means to purify the permeate stream prior to introduction into the means to recycle.

24. The system of claim 21 in which the semipermeable membrane means comprises a ceramic membrane having a nominal pore size between about 2 and 200 nm.

* * * * *